Jan. 21, 1964   L. ALFILLÉ ET AL   3,118,819
NUCLEAR FUEL CARTRIDGE
Filed Nov. 17, 1959   5 Sheets-Sheet 1

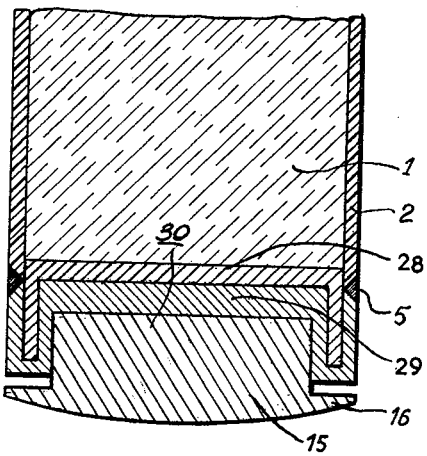
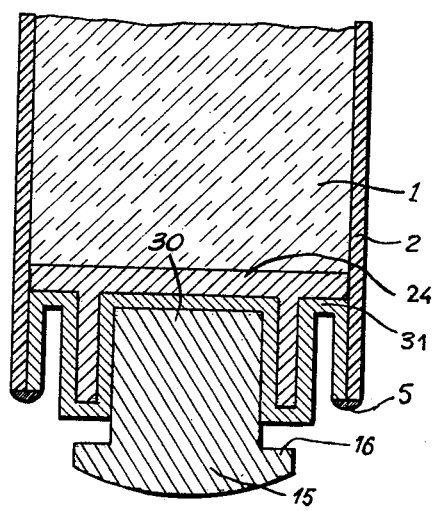

United States Patent Office 3,118,819
Patented Jan. 21, 1964

3,118,819
NUCLEAR FUEL CARTRIDGE
Lucien Alfillé, Orsay, Seine-et-Oise, and Jean Ropers, Vanves, Seine, France, assignors to Commissariat a l'Energie Atomique, Paris, France
Filed Nov. 17, 1959, Ser. No. 853,654
Claims priority, application France Nov. 18, 1958
9 Claims. (Cl. 176—79)

In nuclear reactors in which the fuel is vertically disposed, it is convenient and of interest to stack the cartridges vertically since this noticeably reduces the number and size of constituent structures.

If the fuel is metallic, natural uranium or uranium enriched with fissile elements whether in the form of an alloy or not), it stands up easily to the stresses due to the weight of the stack, at the temperatures in question (hot point of the fuel of the order of 550–600° C.).

The sheaths, provided with fins, are under practically no stress and need only be tight to provide heat transmission. The vertical disposition of the cartridges makes it possible to have, without any risk, a hot point of the sheath of the order of 450–500° C., which is noticeably higher than if the cartridges are disposed horizontally, the metal of the sheath remaining very plastic and adapting itself to the deformations of the fuel.

These important advantages, however, are limited by excessive stress on the ends of the cartridge, namely on the plugs. The stopper plugs of the cartridge do not resist well the direct stresses of the weight of the stack, because of their mechanical characteristics with respect to the temperature. The plugs are made of a metal identical or analogous to that of the sheath, so that the plug and the sheath may be welded together.

In the use of such cartridges campering must be prevented in the critical region of the plug at the level of the weld to avoid any risk of breaking the seal.

By observing the operating conditions of such plugs, it is noted that they attain a high temperature, higher than the hot point of the sheath, because of the increase of neutron flow at the extremities of the fuel and because of the reduced dimensions of plugs.

Several means have been adopted in the prior art to limit at the level of the plug, the combined effects of the increase in temperature and of the physical stresses. These means include limiting the heat flow passing through the plug by the interposition of thermally insulating elements, such as for example, ceramic materials, between the fuel and the plug, and by the increase of the dimensions of the plugs with fins to improve cooling thereof.

These arrangements are unsatisfactory since the dimensions of the plugs should be reduced. To improve the mechanical stability of the fuel, the length of the cartridges should be reduced. This increases the number of plugs, and it is necessary to reduce the dimensions of the plugs to decrease neutron absorption.

Thermodynamic requirements for extraction of energy from the irradiated cartridges require operation at highest possible temperatures of the hot points of the sheaths. Known means for limiting the heat flow through the plugs of the vertically stacked cartridges are insufficient to keep the plugs at the required temperatures.

The present invention overcomes the above mentioned disadvantages by providing cartridges whose ends have a structure such that the cartridges, loaded with nuclear fuel, may, if desired, be vertically stacked and have good stability of the plugs closing the ends of the cartridges the conditions of use of the cartridges.

The cartridge in accordance with the present invention has a plug closing its lower end provided with at least one binding of a material more resistant to flow than the material of the plug. By binding is meant, a member comprising at least one annular portion encompassing the body of the plug.

In the present cartridge the plug may be of a material different from that of the sheath constituting the cartridge, but is preferably made of the same alloy as the sheath. The binding is of a material more resistant to flow and may be a refractory material. The binding stops the normal flow of metal of the plug at the temperatures and under the loads to which the plug is subjected during the operation of the reactor.

In accordance with an embodiment of the invention, the binding tightly and laterally surrounds the major part of the body of the plug. A small part of the plug is outside of the binding and in contact with the internal walls of the sheath with the bottom of the plug being outside the binding.

In another embodiment, the bottom of the plug is enclosed in a concave part of the binding which has annular walls surrounding the end of the sheath.

In other embodiments, the binding has projecting portions which are mounted in annular cavities provided for this purpose in the body of the plug. The binding may then include annular portions enclosing the end of the sheath wall.

The binding of the present invention may also be secured on the face of the plug, and be located in the interior of the sheath. The invention may use several binding elements instead of a single binding. The plug may then have a collar encircling it laterally, and have a second binding with projecting portions mounted in cavities provided for this purpose in the body of the plug.

Two bindings may be mounted in two separate cavities in the plug.

Another modification provides the plug with a collar which is mounted in annular cavities in the plug and with a non-annular reinforcing element fixed in a non-annular cavity in the plug. The reinforcing element is preferably of the same material as the collar.

The binding elements act by triaxial compression of the viscous metal; by formation of localized complex stress fields; by the use of inverse flow, to increase the internal frictions in the metal of the plug and at the contact areas of the binding elements.

These end structures for cartridges may be used jointly with one or more thermally insulating elements interposed between the plug and the fuel. The binding element, according to the invention, may also constitute the thermal insulation if it is suitably located.

The binding elements may for example be formed as follows:

(a) Cylindrical collars of appropriate length, co-axial with the cartridge fitted around a solid metallic mass of a portion of the plug; or fitted around the sheath externally thereof at the level of separation between the fuel and the metal of the plug;

(b) A cap fitted on the body of the plug externally thereof and having an annular cylindrical groove in which the weld between the plug and the sheath is located, the portion of the cap externally of the groove enclosing the end of the sheath;

(c) A casting comprising a flat disc interposed between the fuel and the plug and a cylindrical ring which is mounted in the body of the plug.

The form of the binding elements may also be a combination of the forms described under a, b and c above.

Each end of the cartridge has one or more binding elements whose forms may correspond to the forms a, b and c or a combination thereof.

The binding elements are made of a material which has a good resistance to flow, for example, stainless steel, beryllium, sintered alumina, sintered aluminum powder, or ceramic materials.

The sheaths and the plugs are generally of magnesium or alloys of magnesium, or of aluminum or alloys thereof. Due to the present state of the art of welding light metals and alloys, the metal of the plug should preferably have metallic properties identical or similar to that of the sheath.

By making use of binding elements, it is possible, with plugs of magnesium or magnesium alloys, to construct cartridge end structures capable of supporting without appreciable danger, charges of more than 100 kg. at temperatures above 500° C. for durations of the order of 10,000 hours without noticeable deformations.

With reference to the accompanying schematical longitudinal sections of FIGS. 1 to 10, there will now be described several illustrative embodiments of the present invention, of end structures of nuclear fuel cartridges which may be vertically stacked and supported, one on top of another.

The various features described with reference to these embodiments are considered as part of the invention, it being understood that any equivalent features may also be employed within the scope of the invention.

FIGURES 9 and 10 are two modifications of the structure of FIGURE 8.

The drawings show only the elements necessary to an understanding of the invention.

All the figures show the fuel 1, the sheath 2, a plug, binding elements and the weld 5.

Figure 1:
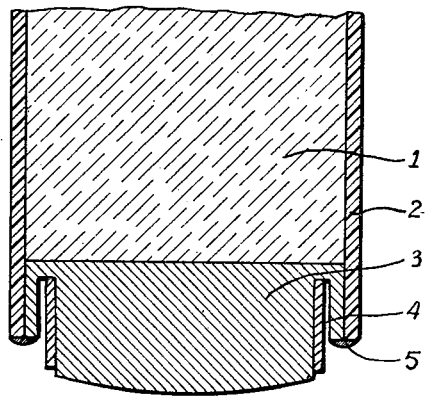
FIGURES 1, 3 and 5 show structures according to the invention having binding elements external to the plug, in the shape of collars or caps.

FIGURE 1 shows a plug 3 of magnesium alloy comprising 0.6% of zirconium. The sheath 2 has fins, not shown, and is of an alloy identical to that of the plug. The weld 5 between the plug and the sheath is raised. The fuel consists of a bar 1 of natural uranium, 35 mm. in diameter.

The binding element is a collar 4 shrunk or cold fitted on the part of the plug which rests on the adjacent cartridge. This element is of beryllium or of stainless steel.

Figure 2:
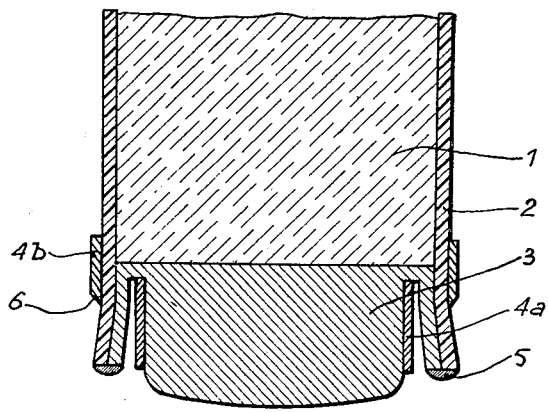
FIGURES 2 and 4 are modifications of the structures of FIGS. 1 and 3 respectively.

The modified embodiment shown in FIG. 2 permits higher plug temperatures and includes the addition of a supplementary collar 4b, located on the sheath 2, at the level of contact between the plug 3 and the fuel 1. The collar 4a is similar to the collar 4 of FIG. 1.

The collar 4b is held in place by slightly spreading the periphery of the plug 3 and of the sheath 2 before welding the plug. The edge 6 of the collar at the plug end thereof is bevelled so as to penetrate into the metal of the sheath 2 during the temperature cycles.

Figure 3:
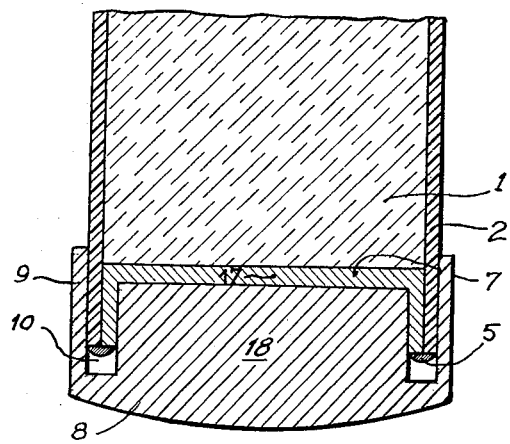

FIG. 3 shows another arrangement of the plug 17 and of the binding element 18. The plug 17 is of magnesium alloy and has the shape of a cup whose bottom 7 is only a few millimeters thick. The weld 5 between the plug 17 and sheath 2, which is of an alloy analogous to that of the plug 17, is raised.

The binding element is of beryllium or stainless steel and is constituted by a single piece forming a supporting piston 8, and a lateral sheath engaging collar 9. The viscous metal of the plug 17 can only flow towards the weld or along the sheath on the side of the fuel.

A clearance of a few millimeters is provided in the groove 10 between the binding element 18 and the weld 5. The fitting clearance of this element is subsequently eliminated by the first deformations.

Figure 4:
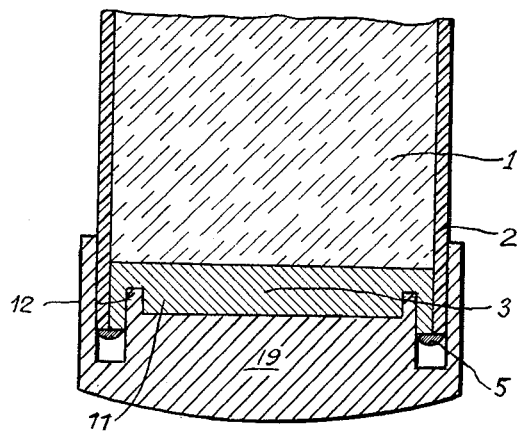

FIG. 4 shows a modification of the preceding structure. The shape of the binding element 19 is such that the plug 3 of magnesium alloy has in its central portion a metal reserve 11 which gives the plug good stability at higher temperatures. If the binding element 19 is of an absorbent material, the thickness of the reserve 11 in the longitudinal direction of the cartridge may be increased and the thickness of the binding decreased. Flow of metal from the reserve 11 towards the raised weld 5 is hindered by the flange 12 of the binding element.

As in the structure shown in FIG. 3, a clearance of a few millimeters is provided between the weld 5 and the binding element 19.

Figure 5:
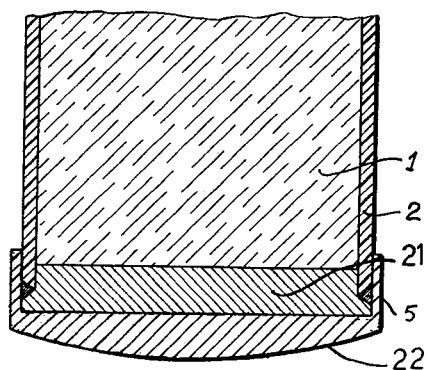

The structure shown in FIG. 5 comprises a disc shaped plug 21, 4 to 5 millimeters in diameter, laterally welded at 5 to the sheath 2. The plug 21 and the sheath 2 are of magnesium alloy. The fuel 1 consists of a bar of natural uranium, 35 mm. in diameter. The binding element 22 is in the shape of a cap covering the bottom of the plug 21 and the marginal wall portions of the sheath 2.

Figure 6:
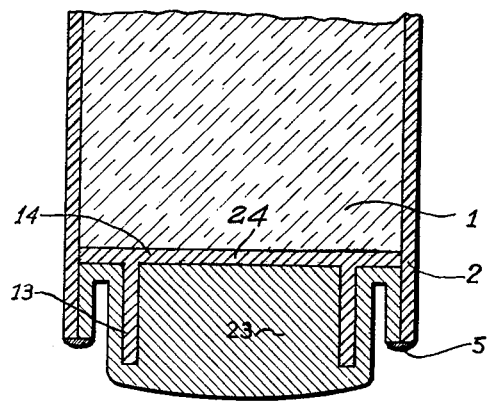
FIGURES 6 and 8 illustrate structures in accordance with the invention having at least one binding element situated between the fuel and the plug.

The binding element 24 of the structure shown in FIG. 6 is of magnesium-thorium alloy which has a good flow resistance. The plug 23 is of magnesium-zinc-zirconium alloy ZW. The sheath 2 has a thickness of 1.5 mm. and the weld 5 is raised.

The binding element 22 comprises an annular cylindrical portion 13 mounted in the plug 23 and a disc shaped portion 14 in contact with the fuel 1; the plug bound in this manner has a good stability up to about 400° C.

For higher temperatures the binding element 24 may be of steel or of a metal which is resistant to high temperature and whose corrosion resistance to the cooling fluid is poor.

This binding element may also be made of ceramic material which combines a heat insulating affect with the binding of the plug, the metal of which is viscous.

Figure 7:
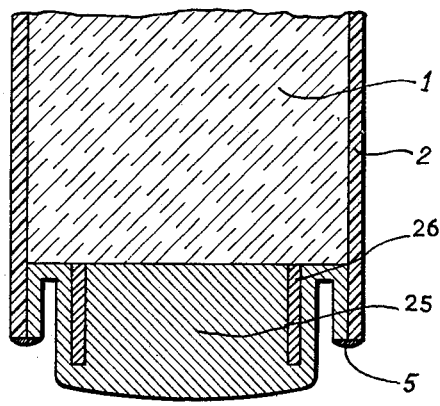
FIGURE 7 is a modification of the structure of FIG. 6.

The modification of FIG. 7 shows a binding element 26 in the shape of a cylindrical ring sunk in the body of the plug 25. The thickness of the binding element 26 is 1 to 2 mm. This element is of ceramic material, alumina or steel. The weld 5 between plug 25 of magnesium and the sheath 2, which also may be of magnesium, is raised.

Figure 8:
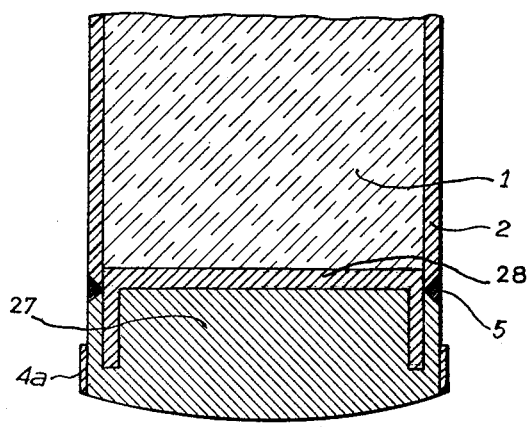

In FIG. 8 there is shown another arrangement of the plug and the binding element. The structure comprises a massive plug 27 welded laterally at 5 to the sheath 2. The plug and the sheath 2 are of magnesium alloy; the thickness of the sheath is 1.5 mm.; the structure has two binding elements 4a and 28; the elements 4a is a cylindrical stainless steel band of thickness 0.5 to 1 mm., which blocks the lateral flow of the metal of the plug; and the element 28 is of the same nature as the element 26 described in the structure shown in FIG. 7, and is protected by the cartridge from corrosion by the cooling fluid of the nuclear reactor.

FIGS. 9 and 10 show modifications of the preceding embodiment having reinforcing elements 30. The plugs 29 and 31 respectively and the sheath 2 are of magnesium alloy containing 0.6% or zirconium; the binding elements 28 and 24 respectively are of beryllium and have a massive portion or piston 15 and a flange 16. Before use there is a play of 0.5 mm. between the flange and the plug. Upon viscous flow of the plug, the metal is prevented from further flow by the flange 16.

The embodiments of the invention in which an exclusive property or privilege is claimed are defined as follows.

We claim:

1. In a nuclear reactor fuel cartridge, a sheath, a plug subject to plastic distortion at operating conditions of the reactor, closing an end of said sheath, said sheath and said plug being made of a metal selected from the group consisting of magnesium and aluminum and at least one annular member made of a material selected from the group consisting of stainless steel, beryllium, sintered alumina and sintered aluminum powder encompassing and engaging the body of the plug, said member forming an integral part of and being more resistant to plastic distortion at operating conditions of the reactor than said plug.

2. A nuclear fuel cartridge as described in claim 1 in which said member is embedded in said plug and said plug extends into engagement with said sheath.

3. A nuclear fuel cartridge as described in claim 1 in which said member covers the bottom of said plug and engages the adjacent end of said sheath.

4. A nuclear fuel cartridge as described in claim 1 including annular grooves in said plug and projecting portions of said member mounted in said grooves.

5. A nuclear fuel cartridge as described in claim 4 including an annular portion for said member surrounding and engaging the adjacent end of said sheath.

6. A nuclear fuel cartridge as described in claim 4 including a flat portion of said member covering the inner end of said plug within said sheath.

7. In a nuclear fuel cartridge as described in claim 1 a second annular member integrally fitted within said plug, said first member encircling the exterior of said plug.

8. A nuclear fuel cartridge as described in claim 2 including a second annular member, projecting annular portions on said second member and cavities in said plug receiving and filled by said annular projecting portions.

9. A nuclear fuel cartridge as described in claim 1 including a solid cylindrical re-enforcing element integrally fitted in the bottom of said plug.

References Cited in the file of this patent

UNITED STATES PATENTS

| | | |
|---|---|---|
| 2,848,800 | Maloney et al. | Aug. 26, 1958 |
| 2,855,355 | Ohlinger et al. | Oct. 7, 1958 |
| 2,863,816 | Stacy | Dec. 9, 1958 |
| 2,871,555 | Foster | Feb. 3, 1959 |
| 2,871,558 | Colbeck | Feb. 3, 1959 |
| 2,873,238 | Ohlinger et al. | Feb. 10, 1959 |
| 2,885,335 | Moore et al. | May 5, 1959 |
| 2,927,071 | Huey | Mar. 1, 1960 |
| 2,952,603 | Boller et al. | Sept. 13, 1960 |
| 2,985,575 | Dennis et al. | May 23, 1961 |
| 2,999,059 | Treshow | Sept. 5, 1961 |

FOREIGN PATENTS

| | | |
|---|---|---|
| 784,890 | Great Britain | Oct. 16, 1957 |
| 790,389 | Great Britain | Feb. 5, 1958 |

OTHER REFERENCES

Chemical and Process Engineering, September 1959, p. 313.